United States Patent
Scates (10) Patent No.: US 11,079,504 B2
(45) Date of Patent: Aug. 3, 2021

(54) DIFFERENTIAL NEUTRON SPECTRUM GENERATOR AND RELATED METHODS AND SYSTEMS

(71) Applicant: Battelle Energy Alliance, LLC, Idaho Falls, ID (US)

(72) Inventor: Wade Scates, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 621 days.

(21) Appl. No.: 15/971,767

(22) Filed: May 4, 2018

(65) Prior Publication Data
US 2018/0329091 A1    Nov. 15, 2018

Related U.S. Application Data

(60) Provisional application No. 62/505,200, filed on May 12, 2017.

(51) Int. Cl.
| | |
|---|---|
| *G01T 7/00* | (2006.01) |
| *G21G 4/02* | (2006.01) |
| *G01T 3/06* | (2006.01) |
| *G01T 3/08* | (2006.01) |
| *H05H 3/06* | (2006.01) |

(52) U.S. Cl.
CPC ............. *G01T 7/005* (2013.01); *G01T 3/065* (2013.01); *G01T 3/085* (2013.01); *G21G 4/02* (2013.01); *H05H 3/06* (2013.01)

(58) Field of Classification Search
CPC .......... G01T 7/005; G01T 3/065; G01T 3/085; G21G 4/02; H05H 3/06
See application file for complete search history.

(56) References Cited

U.S. PATENT DOCUMENTS

2016/0195636 A1\*   7/2016  Grau ..................... G01V 5/104
                                                    250/269.2
2018/0299570 A1\*  10/2018  Degtiarenko ............. G01T 7/00

OTHER PUBLICATIONS

Crane et al., "Neurton Detectors", Passive Nondestructive Assay Manual—PANDA, LA-UR-90-732, (Mar. 1991) pp. 379-406.
(Continued)

*Primary Examiner* — Yara B Green
(74) *Attorney, Agent, or Firm* — TraskBritt (57) ABSTRACT

A neutron spectrum generator is disclosed herein including a neutron source, a scatterer positioned in a direct path between the neutron source and a neutron detector, and a material shell configured to have at least one non-uniform characteristic selected from the group consisting of a material, a thickness, a length, an angle, a layer, and combinations thereof to generate a specific spectrum at the neutron detector that is different than the spectrum of the neutron source. A related method includes measuring a first response generated by a first material shell of a neutron spectrum generator interacting with a neutron source, replacing the first material shell with a second material shell, measuring a second response generated by a second material shell of a neutron spectrum generator interacting with the neutron source, and determining a total fission response by determining a difference between the first response and the second response.

20 Claims, 8 Drawing Sheets

(56) References Cited

OTHER PUBLICATIONS

El-Kheshen, "Glass as Radiation Sensor", Current Topics in Ionizing Radiation Research, InTech, available from https://www.intechopen.com/booksicurrent-topics-in-ionizing-radiation-researchiglass-as-radiation-sensor, (Mar. 2012) pp. 579-602.

Radev, "Neutron Sources for Standard-Based Testing", Lawrence Livermore National Laboratory, (Nov. 2014) 12 pages.

SoNDe, "Solid-State Neutron Detector", Deliverable Report: D1.1 Demonstrator, (Jan. 2014) 66 pages.

Vaughn, "Investigation of a Passive, Temporal, Neutron Monitoring System that Functions within the Confines of Start I", Theses of Stephanie Vaughn, Department of the Air Force Air university, Air Force Institute of Technology (Mar. 2003), 92 pages.

\* cited by examiner

DIFFERENTIAL NEUTRON SPECTRUM GENERATOR AND RELATED METHODS AND SYSTEMS

CROSS-REFERENCE TO RELATED APPLICATION

This application claims the benefit under 35 U.S.C. § 119(e) of U.S. Provisional Patent Application Ser. No. 62/505,200, filed May 12, 2017, the disclosure of which is hereby incorporated herein in its entirety by this reference.

STATEMENT REGARDING FEDERALLY SPONSORED RESEARCH OR DEVELOPMENT

This invention was made with government support under Contract No. DE-AC07-05-ID14517 awarded by the United States Department of Energy. The government has certain rights in the invention.

FIELD

Embodiments of the present disclosure relate generally to neutron detectors, and to methods of generating a specific spectrum with a neutron spectrum generator for calibration or other detection by the neutron detector.

BACKGROUND

The radioisotope Californium-252 (Cf-252) is often used as a compact neutron source that has been the standard for use in the calibration of neutron detectors. Cf-252 exhibits a fission spectrum that peaks at approximately 0.9 MeV, and further exhibits a 2.645 year half-life. Cf-252 is also becoming increasingly expensive (e.g., currently approximately $1 M per mg).

BRIEF SUMMARY

In some embodiments, a neutron spectrum generator, comprises a neutron source, a scatterer positioned in a direct path between the neutron source and a neutron detector, and a material shell positioned proximate the neutron source, and configured with at least one non-uniform characteristic selected from the group consisting of a material, a thickness, a length, an angle, a layer, and combinations thereof to generate a specific spectrum responsive to interacting with neutrons that is different than the spectrum of the neutron source.

In some embodiments, a method for generating a specific neutron spectrum comprises measuring a first response generated responsive to a first material shell of a neutron spectrum generator interacting with a neutron source, replacing the first material shell with a second material shell, measuring a second response generated responsive to a second material shell of a neutron spectrum generator interacting with the neutron source, and determining a total fission response by determining a difference between the first response and the second response.

DETAILED DESCRIPTION

In the following description, reference is made to the accompanying drawings in which are shown, by way of illustration, specific embodiments in which the disclosure may be practiced. The embodiments are intended to describe aspects of the disclosure in sufficient detail to enable those skilled in the art to make, use, and otherwise practice the invention. Furthermore, specific implementations shown and described are only examples and should not be construed as the only way to implement the present disclosure unless specified otherwise herein. It will be readily apparent to one of ordinary skill in the art that the various embodiments of the present disclosure may be practiced by numerous other partitioning solutions. Other embodiments may be utilized and changes may be made to the disclosed embodiments without departing from the scope of the disclosure. The following detailed description is not to be taken in a limiting sense, and the scope of the present invention is defined only by the appended claims.

In the following description, elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths, and the present disclosure may be implemented on any number of data signals including a single data signal.

The various illustrative logical blocks, modules, and circuits described in connection with the embodiments disclosed herein may be implemented or performed with a general-purpose processor, a special-purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A general-purpose processor may be considered a special-purpose processor while the general-purpose processor executes instructions (e.g., software code) stored on a computer-readable medium. A processor may also be implemented as a combination of computing devices, e.g., a combination of a DSP and a microprocessor, a plurality of microprocessors, one or more microprocessors in conjunction with a DSP core, or any other such configuration.

Also, it is noted that embodiments may be described in terms of a process that may be depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on computer-readable media. Computer-readable media include both computer storage media and communication media, including any medium that facilitates transfer of a computer program from one place to another.

It should be understood that any reference to an element herein using a designation such as "first," "second," and so forth, does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

Embodiments of the disclosure include employing a neutron spectrum generator that is configured to generate specific spectra that is different than the spectrum of the neutron generator itself. The neutron spectrum generator may be employed to calibrate a neutron detector to a specific spectra. In some embodiments, different material shells may be constructed for the neutron spectrum generator to achieve energy dependent neutron detector calibrations. Scattered and/or secondary neutrons radiating from various materials may be detected to build up a first spectrum, and a second set of materials may be used to build up a second spectrum. These spectrums may be subtracted to achieve the desired spectrum. Neutron detectors may include active detectors or passive detectors. Neutron detectors are not limited to electrically charged detection media such as gas-filled chambers, proportional counters, scintillators (e.g., liquid, crystals, plastics, glass, scintillator fibers, etc.), fission chambers, B-lined chambers, semiconductor neutron detectors (e.g., High Purity Germanium (HPGe)), and other similar detectors known to those of ordinary skill in the art. Neutron detectors, as used herein, may also include any neutron sensitive material that changes behavior due to neutrons that can be measured. For example, neutron detectors may include materials such as activation foils, embrittled materials, glasses, etc., which are activated or altered responsive to neutrons.

Figure 1:
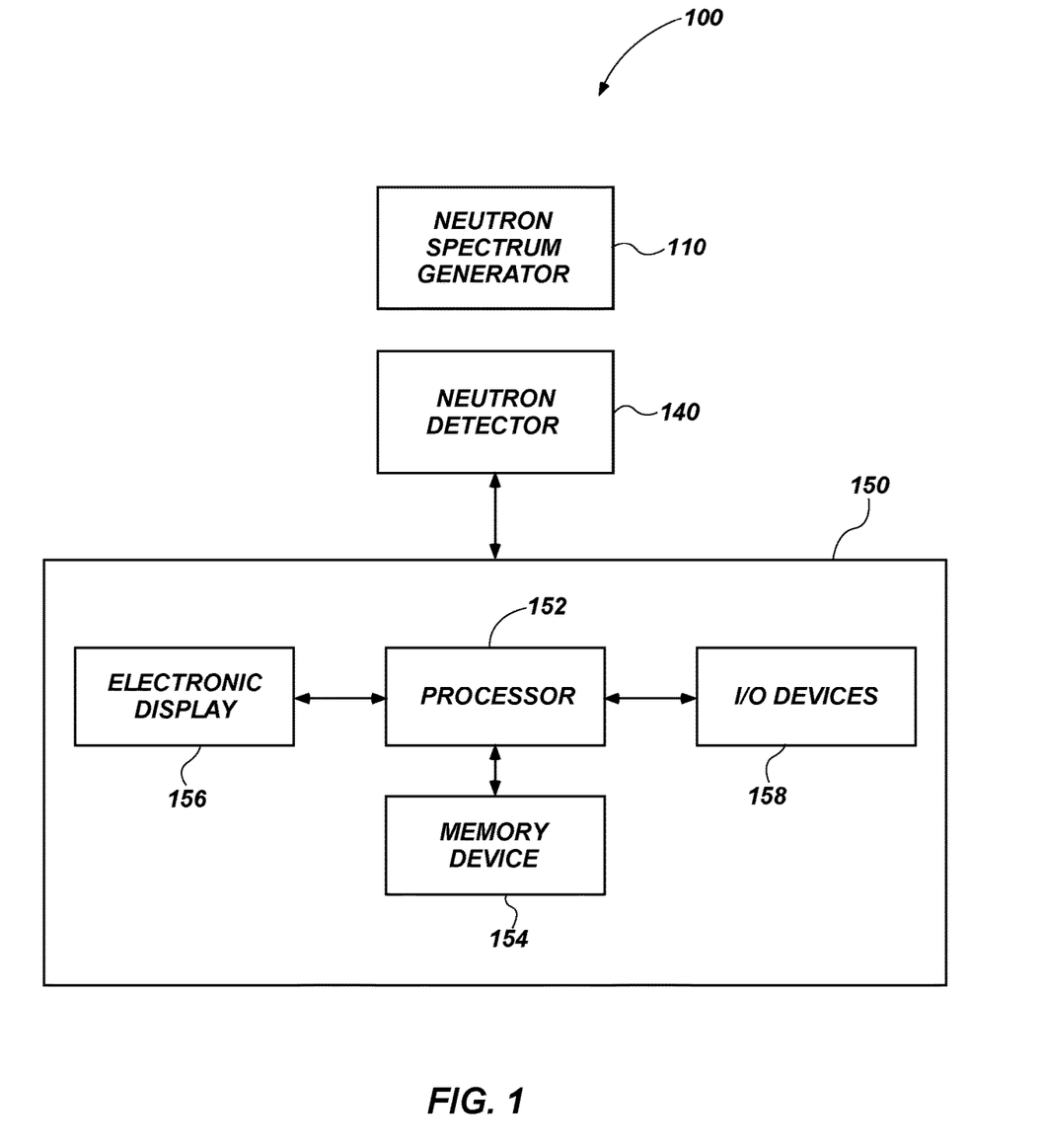
FIG. 1 is a schematic block diagram of a neutron detection system according to an embodiment of the disclosure.

FIG. 1 is a schematic block diagram of a neutron detection system 100 according to an embodiment of the disclosure. The neutron detection system 100 may include a neutron detector 140 operably coupled with a data acquisition system 150. The data acquisition system 150 may include a processor 152 operably coupled with one or more of a memory device 154, an electronic display 156, or input/output devices 158 that collectively are configured to process, analyze, and/or view the responses from the neutron detector 140. The neutron detection system 100 may further include a neutron spectrum generator 110 configured to generate neutrons having a predetermined spectrum that is different than the spectrum of the neutron source used within the neutron spectrum generator 110, as will be described in further detail below.

Figure 2A:
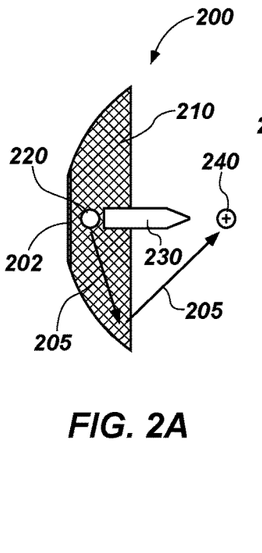
FIGS. 2A, 2B, and 2C show a portion of a simplified neutron spectrum generator according to an embodiment of the disclosure.
Figure 2B:
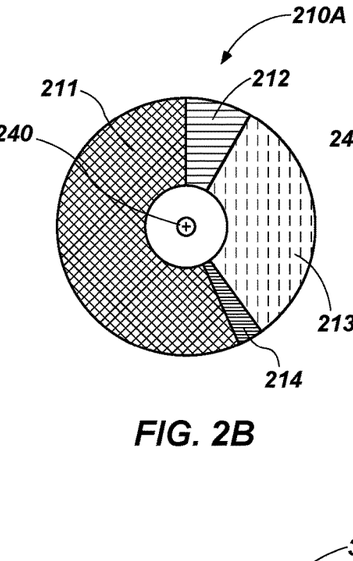
Figure 2C:
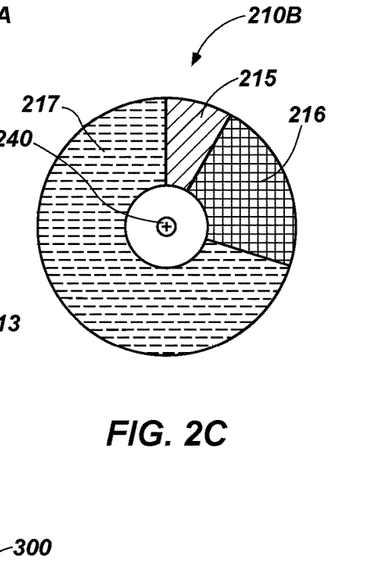

FIGS. 2A, 2B, and 2C show a portion of a simplified neutron spectrum generator 200 according to an embodiment of the disclosure. The neutron spectrum generator 200 may be configured to calibrate a neutron detector 240. The neutron spectrum generator 200 may include a material shell 210, a neutron source 220, and a scatterer 230. As will be discussed further below, different material shells 210 may be used to generate different detector responses that are used to generate the desired spectrum. During a first measurement cycle the material shell 210 may be referred to as a first material shell 210A, and during a second measurement cycle the material shell 210 may be referred to as a second material shell 210B. FIG. 2A is a side view of the neutron spectrum generator 200, FIG. 2B is a front view of the neutron spectrum generator 200 with the first material shell 210A, and FIG. 2B is a front view of the neutron spectrum generator 200 with the second material shell 210B.

The neutron spectrum generator 200 is configured to generate a desired fission-shaped spectrum that is different than the spectrum generated directly by the neutron source 220. The neutron spectrum generator 200 may also be configured to determine the efficiency of the neutron detector 240 responsive to the generated spectrum. In operation, this efficiency may be determined by first determining the detector's 240 response (referred to as the "first response") to the first material shell 210A being exposed to the neutron source 220, as well as the detector's 240 response (referred to as the "second response") to the second material shell 210B being exposed to the neutron source 220. In some embodiments, the second response may be subtracted from the first response, yielding the total response associated with the fission spectrum in the neutron detector 240. In some embodiments, one of the first response or the second response is a positive response while the other is a negative response. As a result, the first material shell 210A may be referred to as a "positive proxy shell" and the second material shell 210B may be referred to as a "negative proxy shell." In some embodiments, the responses may exhibit a single peak or multiple peaks as desired.

The construction of the neutron spectrum generator 200 may be configured such that the resulting fission spectrum may approximate any desired spectra that is different than the spectrum of the neutron source 220. For example, in some embodiments, the resulting fission spectrum may approximate the spectrum for Cf-252 even when the neutron source 220 is not Cf-252. Other spectra may also be simulated in other embodiments. For example, it is contemplated that the characteristics of the material shells 210A, 210B may be adjusted to approximate reactor spectra that are smooth (e.g., $1/E^n$ spectra), other spontaneous fission spectra (e.g., uranium, plutonium (Pu), Plutonium-Beryllium (PuBe)), and active fission spectra. In some embodiments, additional material shells may be employed (e.g., greater than two). Such embodiments may be beneficial for creating more complex spectra (e.g., multiple peaks).

The neutron source 220 may be configured to produce neutrons, such as by fusing isotopes of hydrogen together. In some embodiments, the neutron source 220 may be a DT generator that produces neutrons by fusion of deuterium (D) and tritium (T). The resulting neutrons of a DT generator exhibit a kinetic energy of approximately 14 MeV. In some embodiments, the neutron source 220 may be a DD generator that produces neutrons by fusion of deuterium (D) and deuterium (D). The resulting neutrons of a DD generator may exhibit a kinetic energy of approximately 2.5 MeV. Some embodiments may also include gamma sources configured to eject a neutron, Electron Accelerator Beam impingent on Bremsstrahlung converters, and neutrons created in a Bremsstrahlung converter and/or secondary target.

Each of the material shells 210A, 210B may have different characteristics that may be adjusted to create the desired spectrum due to different interactions with the neutrons 205. Adjusting these characteristics may include an angular adjustment, a thickness adjustment, a material adjustment, layering of the materials, adjusting the extent, or a combination thereof. The material shell may be divided into angular wedges that are perturbed relative to one another in composition, thickness, layering, etc.

In the embodiment of FIG. 2A-2C, the first material shell 210A and the second material shell 210B may have approximately the same shape and extent. The first material shell 210A and the second material shell 210B may differ only in composition and/or thickness. The material shell may be configured with a shape symmetric about the axis, wherein the axis is a vector extending from the neutron source through the scatterer to the neutron detector.

As shown in FIG. 2A, the material shell 210 may be hemispherical in shape. The neutron detector 240 may be located at approximately the mathematical center of the hemisphere. As a result, the neutrons 205 generated at any point in the material shell 210 are approximately the same distance from the neutron detector 240. This allows the radius of the hemisphere to be quoted as the calibration distance of the neutron spectrum generator 200. In some embodiments, the material shell 210 may also include an aperture 202 located behind the neutron source 220. The size of the aperture 202 may be configured such that there may be no path between the material shell 210 and the neutron detector 240 that is obstructed by the scatterer 230.

In FIGS. 2B and 2C, the first material shell 210A may be formed from a plurality of different materials 211, 212, 213, 214 that each have different characteristics and cause different spectral responses in the neutron detector 240 when interacting with the neutrons 205. The second material shell 210B may also be formed from a plurality of different materials 215, 216, 217 that each have different characteristics and cause different spectral responses in the neutron detector 240 when interacting with the neutrons 205. At least some of the materials 211, 212, 213, 214 of the first material shell 210A may be different than the materials 215, 216, 217. Thus, the spectra generated when using the first material shell 210A may be different than the spectra generated when using the second material shell 210B. Each spectrum is generated by detecting and summing the interactions with the material shells 210A or 210B during a measurement cycle.

As discussed above, the scatterer 230 may be positioned between the neutron source 220 and the neutron detector 240 with a shape such that there is not a direct path between the neutron source 220 and the neutron detector 240. The scatterer 230 may be configured to absorb neutrons and/or scatter the neutrons off of a direct path from the neutron source 220 to the neutron detector 240. In other words, the scatterer 230 may be configured to provide an obstruction (e.g., deflect, absorb, etc.) the neutrons originating in the neutron source 220 from directly impacting neutron detector 240. Thus, the direct contribution from the neutron source 220 may be reduced (e.g., eliminated). In some embodiments, the scatterer 230 may be cylindrical, conical, conically truncated, or another shape. The position and shape of the scatterer may also ensure there are no obstructed paths for neutrons travelling from the neutron source 220 to the fissionable material shell 210 and then to the neutron detector 240. In some embodiments, the scatterer 230 may be formed from a material such as tungsten, bismuth, lead, copper, nickel, and combinations thereof, or any other material configured to reduce the direct signal from the neutron source 220 at the neutron detector 240.

The neutron detector 240 may be any detector configured to generate a signal responsive to receiving neutrons from which a spectrum can be constructed by the data acquisition system (FIG. 1). As non-limiting examples, the neutron detector 240 may include a scintillator, a He-gas detector, or other suitable detector.

Figure 3:
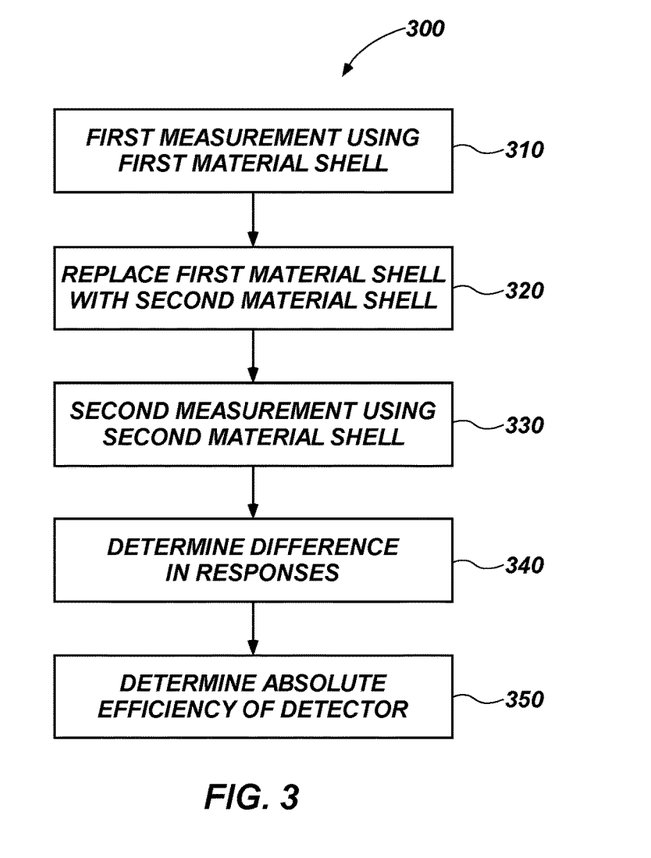
FIG. 3 is a flowchart illustrating a method of generating a specific neutron spectrum according to an embodiment of the disclosure.

FIG. 3 is a flowchart illustrating a method 300 of generating a specific neutron spectrum according to an embodiment of the disclosure. In some embodiments, this method 300 may be used to calibrate the neutron detector.

At operation 310, a first measurement of a first response may be performed using the first material shell 210A (e.g., FIG. 2B). The first response in the neutron detector 240 operation is recorded ($R_{P+}$). At operation 320, the first material shell 210A may be replaced by the second material shell 210B (FIG. 2C). At operation 330, a second measurement of a second response may be performed using the second material shell 210B, yielding the second response ($R_{P-}$). At operation 340, the difference in the two responses ($R_{P+}-R_{P-}$) may be performed to yield the total response to the Target Spectrum ($R_T$). At operation 350, the efficiency ($\varepsilon_T$) of the neutron detector 240 responsive to the Target Spectrum may be determined. Because the Target Neutron Flux ($F_T$ or $F_{P+}-F_{P-}$) can be determined computationally, the efficiency of the neutron detector 240 responsive to the Target Spectrum may be defined as:

$$\varepsilon_T = \frac{R_{P+} - R_{P-}}{F_{P+} - F_{P-}}. \qquad (1)$$

The following is a derivation of this result. The neutrons emanating from the overall system include a combination of:

$S_{14}$: the direct neutrons (e.g., 14 MeV);
$S_{ux}$: (n,xn) neutrons in the material shell;
$S_{uf}$: (n,f) neutrons in the material shell; and
$S_{us}$: scattered neutrons in the material shell.

The energy dependent efficiency of the detector is:

$$\varepsilon(E) \qquad (2)$$

The neutron spectrum from a first material shell is:

$$\phi_{P+}(E) \qquad (3).$$

The neutron flux at the detector is an integral of the spectrum over energy:

$$F_{P+} = \int \phi_{P+}(E) dE \qquad (4).$$

The detector response due to the first material shell system is:

$$R_{P+} = \int \varepsilon(E) \phi_{P+}(E) dE \qquad (5).$$

The neutron spectrum from the second material shell is:

$$\phi_{P-}(E) \qquad (6).$$

The neutron flux at the detector is an integral of the spectrum over energy:

$$F_{P-} = \int \varepsilon \phi_{P-}(E) dE \qquad (7).$$

The detector response due to the second material shell system is:

$$R_{P-} = \int \varepsilon(E) \phi_{P-}(E) dE \qquad (8).$$

The efficiency of the detector to an arbitrary spectrum $\phi_\alpha(E)$ is:

$$\varepsilon_\alpha = \frac{\int \varepsilon(E) \phi_\alpha(E) dE}{\int \phi_\alpha(E) dE} = \frac{R_\alpha}{F_\alpha}. \qquad (9)$$

The first and second proxies are chosen such that the difference in their spectra matches a Target Spectrum (such as Cf-252 fission neutrons):

$$\phi_{P+}(E) - \phi_{P-}(E) = \phi_T(E) \qquad (10).$$

The neutron flux at the detector is an integral of the spectrum over energy is:

$$F_T = \int \phi_T(E) dE = \int (\phi_{P+}(E) - \phi_{P-}(E)) dE = \int \phi_{P+}(E) dE - \int \phi_{P-}(E) dE = F_{P+} - F_{P-} \qquad (11).$$

The detector response due to the Target Spectrum is:

$$R_T = \int \varepsilon(E) \phi_T(E) dE = \int \varepsilon(E) (\phi_{P+}(E) - \phi_{P-}(E)) dE = \int \varepsilon(E) \phi_{P+}(E) dE - \int \varepsilon(E) \phi_{P-}(E) dE = R_{P+} - R_{P-} \qquad (12).$$

Merging Eqs. (10), (11), (12), the detector efficiency to the Target Spectrum, Eq (1) is determined:

$$\varepsilon_T = \frac{R_T}{F_T} = \frac{R_{P+} - R_{P-}}{F_{P+} - F_{P-}}. \qquad (13)$$

Figure 4A:
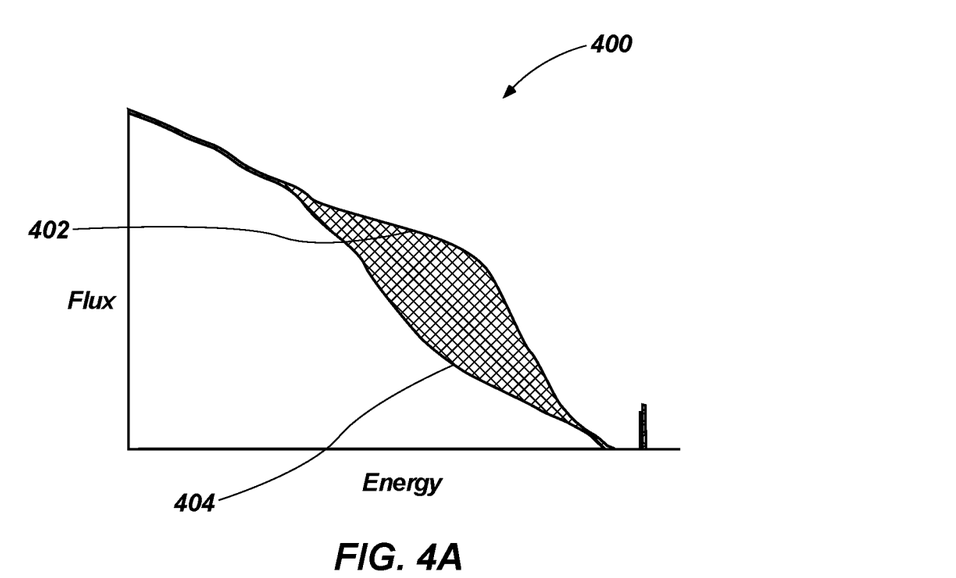
FIGS. 4A and 4B are plots illustrating the energy/flux curves for each of the detector's responses associated with the material shells of FIGS. 2B and 2C.
Figure 4B:
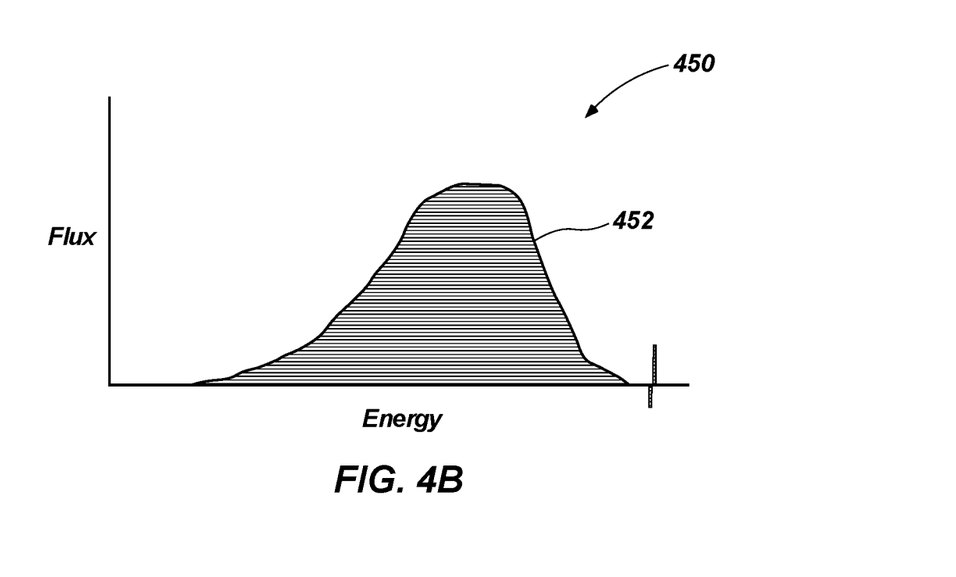

FIG. 4A is a plot 400 illustrating the energy/flux curves for each of the responses due to the material shells of FIGS. 2B and 2C. In particular, the first response 402 corresponds to the first measurement cycle using the first material shell 210A, and the second response 404 corresponds to the second measurement cycle using the second material shell 210B. FIG. 4B is a plot 450 illustrating the energy/flux curve for the difference 452 of the first response 402 and the second response 404, which is used to determine the absolute efficiency of the detector.

In some embodiments, a larger set (e.g., three or more) of material shells may be utilized that result in dissimilar responses. As a result, an energy calibration may be performed on the neutron detector itself to generate energy dependent efficiency curves for the neutron detector. Each material shell may have a dissimilar response relative to the other shells to unfold the response of the neutron detector because of the different spectra of the neutrons being detected.

Figure 5A:
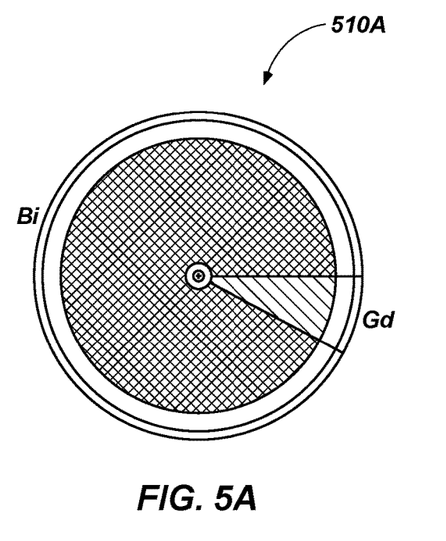
FIGS. 5A and 5B are front views of material shells according to another embodiment of the disclosure.
Figure 5B:
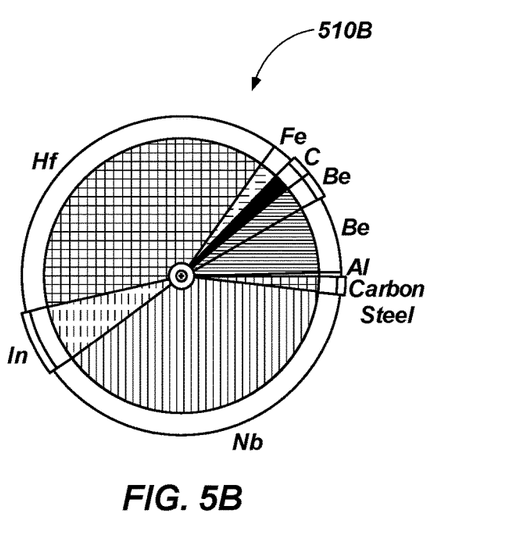

FIGS. 5A and 5B are front views of material shells 510A, 510B according to another embodiment of the disclosure. In particular, the material shells 510A, 510B may be configured to have individual responses, that when subtracted, provide a total response for the fission neutrons only for a desired spectra. For example, the first material shell 510A may include a plurality of different materials (e.g., Bismuth (Bi), Gadolinium (Gd)). The second material shell 510B may also include a plurality of different materials (e.g., Hafnium (Hf), Iron (Fe), Carbon (C), Beryllium (Be), Aluminum (Al), Carbon Steel, Niobium (Nb), Indium (In)). Of course, other combinations of materials, thicknesses, etc., may be used to generate the desired spectra for a particular application.

Figure 6:
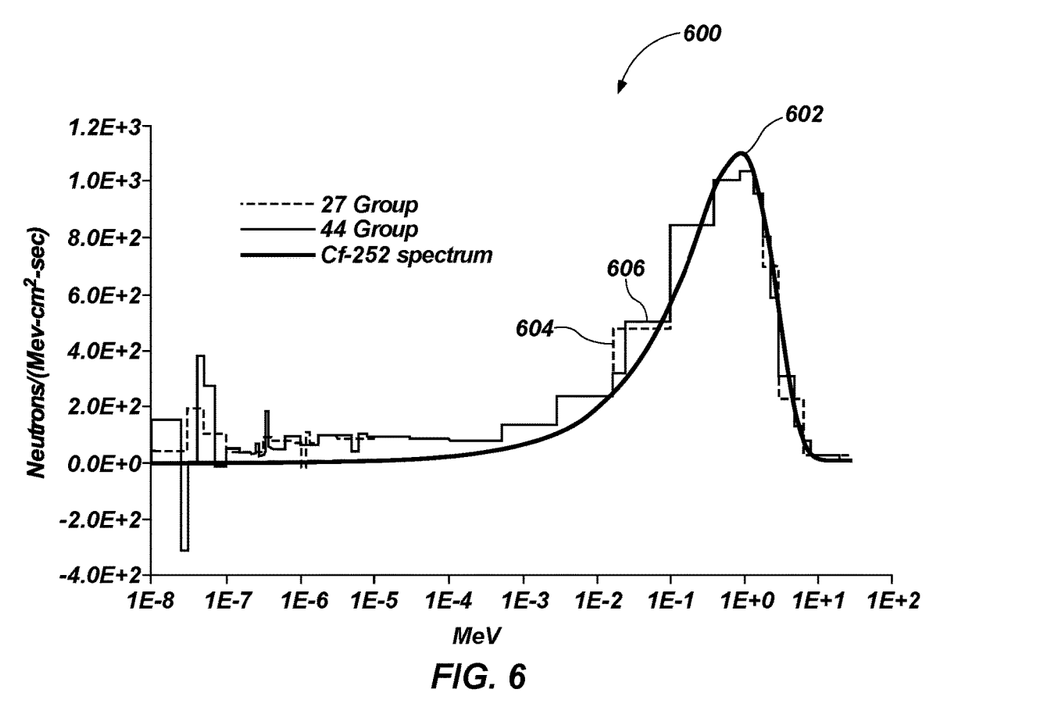
FIG. 6 is a plot showing the Cf-252 spectrum compared with spectra generated using different neutron spectrum generators approximating the Cf-252 spectrum according to embodiments herein.

FIG. 6 is a plot 600 showing the Cf-252 spectrum 602 compared with spectra 604, 606 generated using different neutron spectrum generators configured with a hemispheric shape as in FIGS. 2A-2C and FIGS. 5A, 5B to generate Target Spectrum approximating the Cf-252 spectrum according to embodiments herein.

Figure 7A:
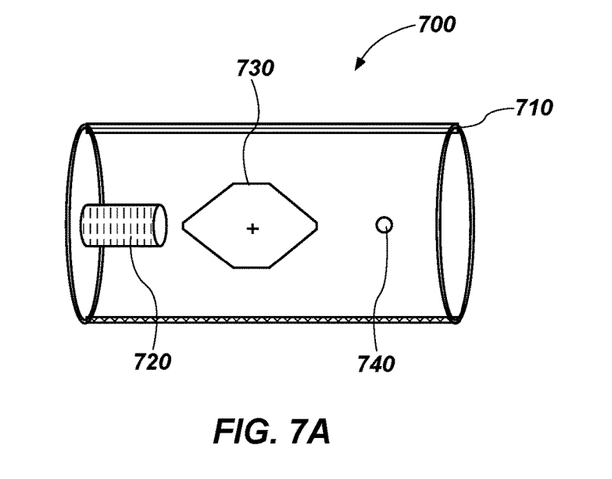
FIGS. 7A and 7B are simplified diagrams of a neutron spectrum generator according to another embodiment of the disclosure.
Figure 7B:
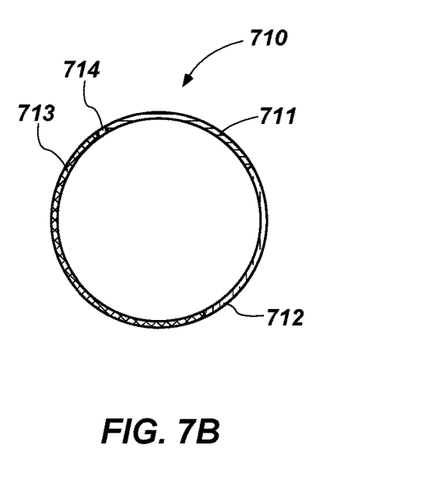

FIGS. 7A and 7B are simplified diagrams of a neutron spectrum generator 700 according to another embodiment of the disclosure. FIG. 7A is a side view of the neutron spectrum generator 700, and FIG. 7B is a front view of its material shell 710. The neutron spectrum generator 700 may include the material shell 710, neutron source 720, scatterer 730, and neutron detector 740 that are configured similar to the elements of FIG. 2A. The material shell 710, however, may be configured in a cylindrical shape as shown in FIG. 7A. The neutron source 720, the scatterer 730, and the neutron detector 740 may be positioned within the cylindrical material shell 710. The cylindrical shape of the material shell 710 may result in a higher flux and also provide shielding from the room return. In some embodiments, the neutron detector 740 may be positioned outside of the cylindrical material shell 710.

As discussed above, the material shell 710 may include a plurality of different materials 711, 712, 713, 714 and/or vary in other characteristics to have different interactions with neutrons that are summed together to result in a response detected by the neutron detector 740. As with the example described above, different material shells may be used to generate a first response and a second response so that the difference results in the desired spectra.

Figure 8A:
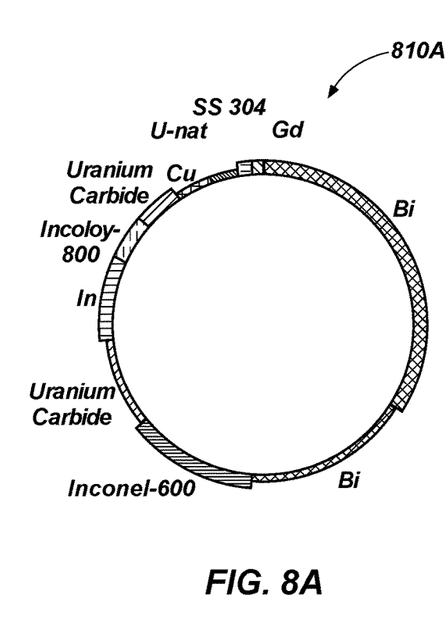
FIGS. 8A and 8B are front views of different material shells that may be used to generate different responses.
Figure 8B:
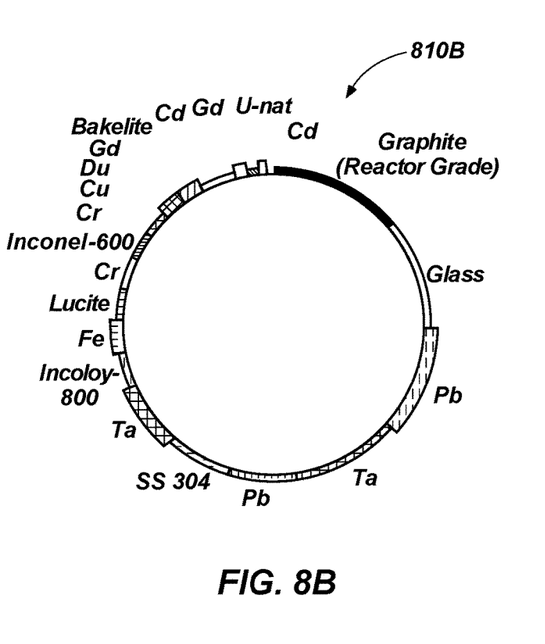

FIGS. 8A and 8B are front views of different material shells 810A, 810B that may be used to generate different responses in the neutron detector. The first material shell 810A may include a plurality of different materials (e.g., Bi, INCONEL®-600 alloy, Uranium Carbide, In, INCOLOY®-800 alloy, Copper (Cu), U-nat, SS 304, Gd). Similarly, the second material shell 810B may include a plurality of different materials 822, 823, 824, 825, 826, 827, 828, 829, 830, 831, 832, 833, 834, 835, 836, 837, 838, 839, 840, 841, 842 (Graphite, Glass, Pb, Ta, Stainless Steel (SS 304), Tantalum (Ta), INCOLOY®-800 alloy, Fe, LUCITE® resin, Chromium (Cr), INCONEL®-600 alloy, Cu, DU, Gd, BAKELITE® resin, Cadmium (Cd), (U-nat). As shown in FIGS. 8A and 8B, not only may the materials be varied, but also other characteristics such as the thickness and extent of each material.

Figure 9A:
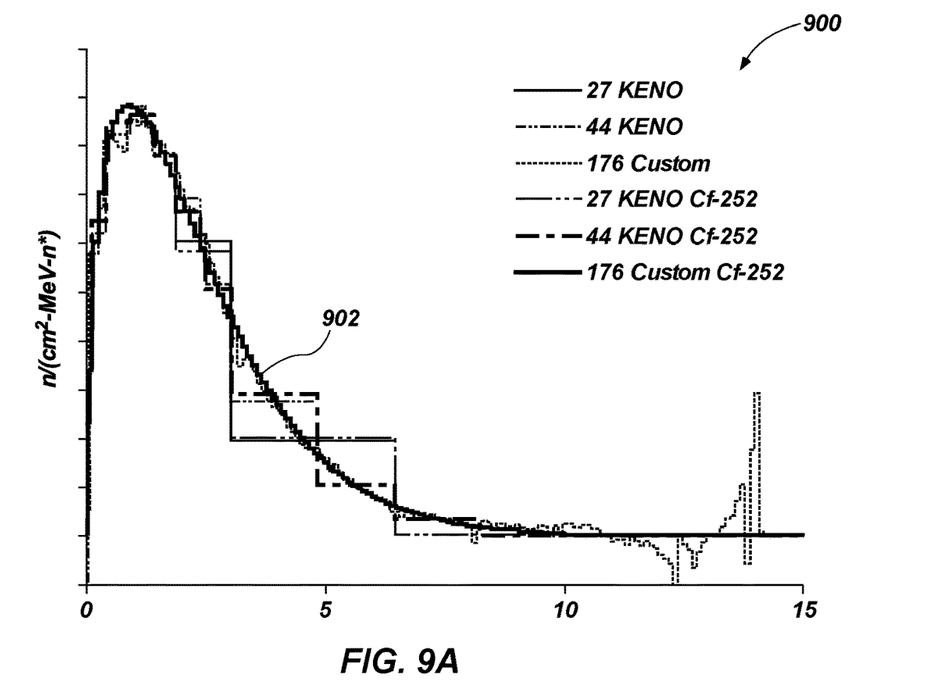
FIGS. 9A and 9B are plots showing a Cf-252 spectrum compared with spectra generated using different neutron spectrum generators approximating the Cf-252 spectrum according to embodiments herein.
Figure 9B:
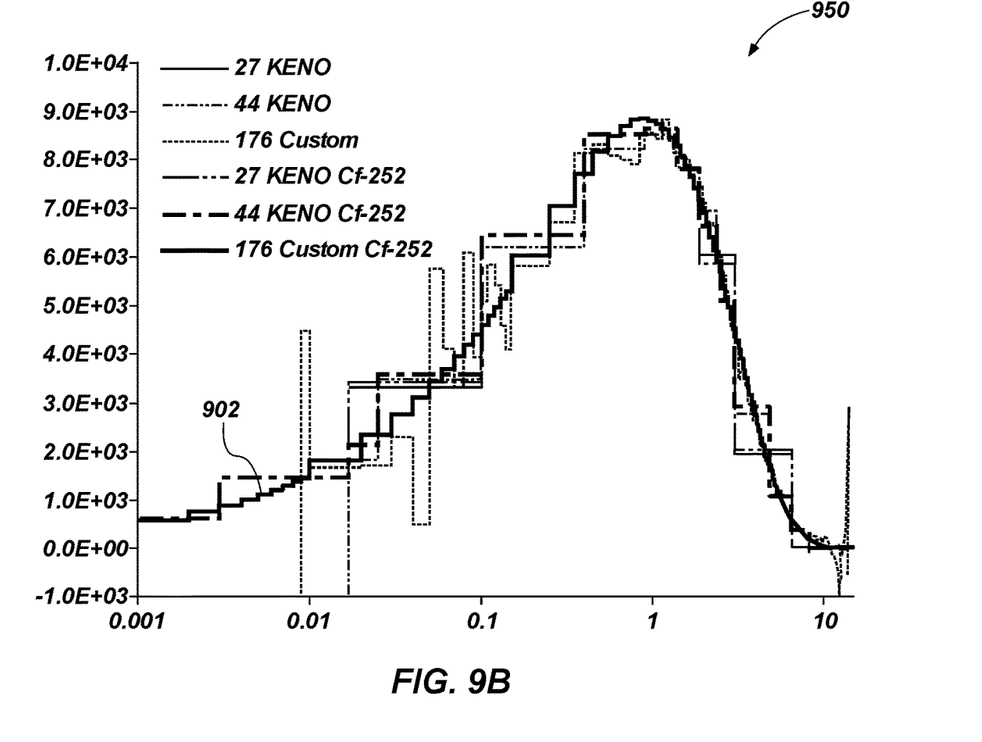

FIGS. 9A and 9B are plots 900, 950 showing a Cf-252 spectrum 902 compared with spectra generated using different neutron spectrum generators configured with a cylindrical shape as in FIGS. 7A, 7B, 8A, 8B to generate Target Spectrum approximating the Cf-252 spectrum according to embodiments herein. In FIG. 9A, the energy (x-axis) is in a linear scale, whereas the energy (x-axis) in FIG. 9B is in a logarithmic scale. The linear scale of FIG. 9A shows that the lower energies are a relatively close fit to the Cf-252 spectrum, and the logarithmic scale of FIG. 9B shows that the higher energies are a relatively close fit to the Cf-252 spectrum.

Figure 10A:
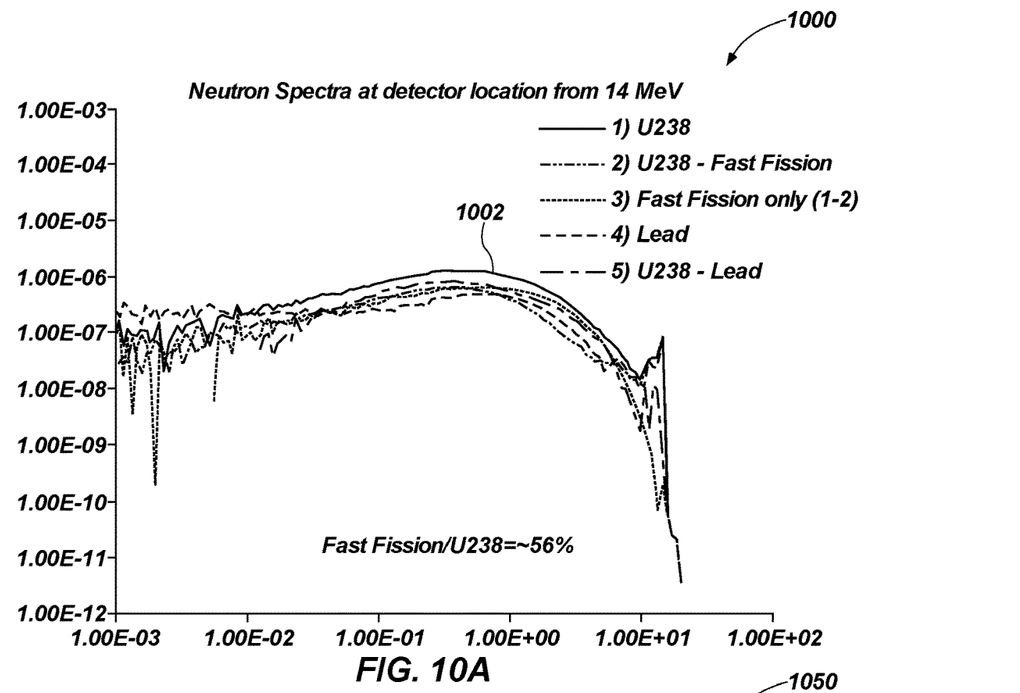
FIGS. 10A and 10B are plots showing a uranium spectrum compared with spectra generated using different neutron spectrum generators approximating the uranium spectrum according to embodiments herein.
Figure 10B:
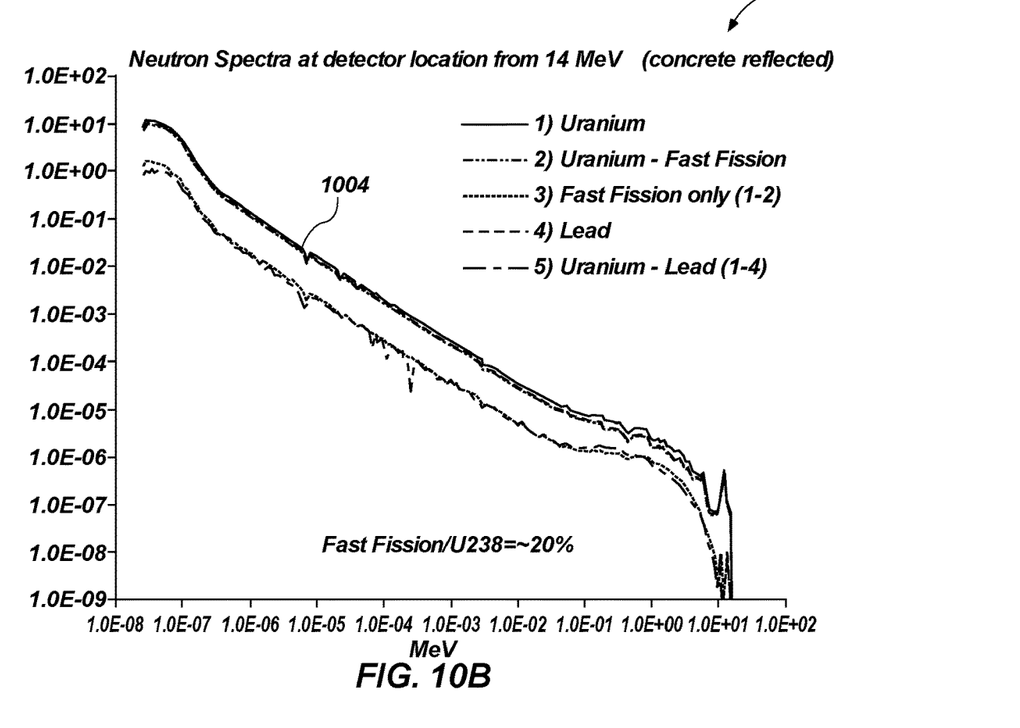

FIGS. 10A and 10B are plots 1000, 1050 showing a uranium spectrum 1002, 1004 compared with spectra generated using different neutron spectrum generators configured with a cylindrical shape as in FIGS. 7A, 7B, 8A, 8B to generate Target Spectrum approximating the uranium spectrum according to embodiments herein. In this example, the first material shell comprises U-238 and the second material shell comprises lead. In FIG. 10B, a concrete sphere was placed around the neutron spectrum generator to simulate room return.

Figure 11A:
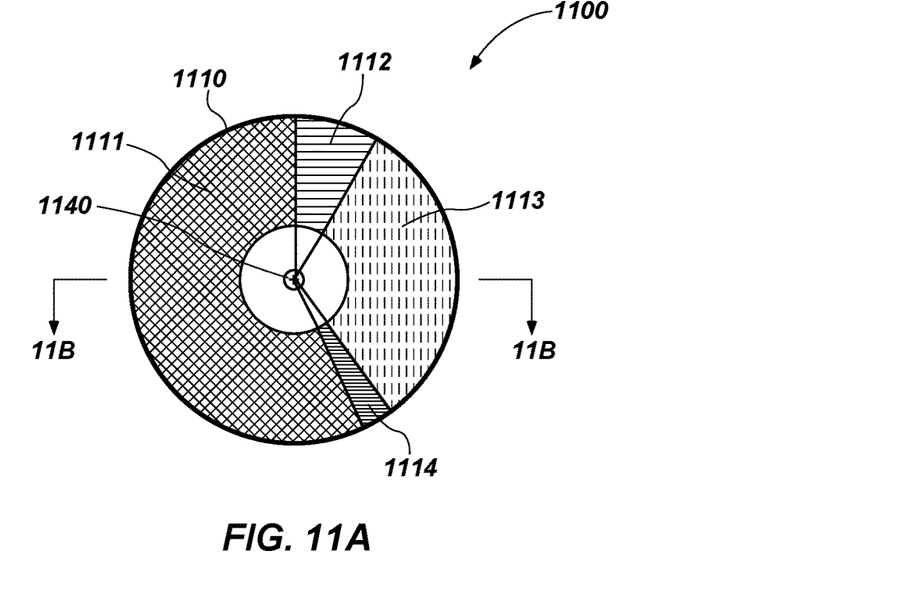
FIGS. 11A and 11B show a simplified neutron spectrum generator according to an embodiment of the disclosure.
Figure 11B:
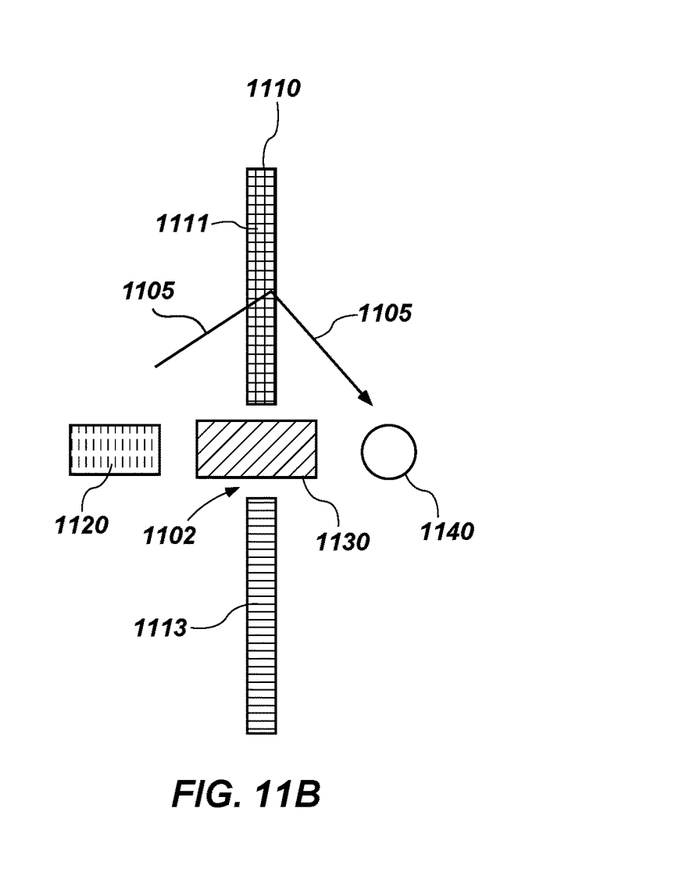

FIGS. 11A and 11B show a simplified neutron spectrum generator 1100 according to an embodiment of the disclosure. FIG. 11A is a front view of the neutron spectrum generator 1100, and FIG. 11B is a cross sectional view of the neutron spectrum generator 1100. The material shell 1110 may include one or more different materials 1111, 1112, 1113, 1114 as discussed above. The material shell 1110 may be shaped as a disc having an aperture 1102 in which the scatterer 1130 may be positioned. The neutron source 1120 and the neutron detector 1140 may be positioned on opposite sides of the material shell 1110 and the scatterer 1130. In such an embodiment, the scattering effect of the neutrons 1105 may be created by passing through the material shell 1110 rather than being reflected. In some embodiments, different features from the different designs may be combined. For example, the disc shaped material shell 1110 may be housed within a cylindrical material shell. In another embodiment, the hemispherical shaped material shell may be placed behind the neutron source 1120 and the disc shaped material shell 1110. In another embodiment, the disc shaped material shell 1110 may be housed within a cylindrical material shell. In another embodiment, the hemispherical shaped material shell may be placed behind the neutron source 1120 and the disc shaped material shell 1110.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the invention as hereinafter claimed, including legal equivalents thereof. In addition, features from one embodiment may be combined with features of another embodiment while still being encompassed within the scope of the invention. Further, embodiments of the disclosure have utility with different and various detector types and configurations.

What is claimed is:

1. A neutron spectrum generator, comprising:
    a neutron source;
    a scatterer positioned in a direct path between the neutron source and a neutron detector; and
    at least one material shell positioned proximate the neutron source, and configured with at least one non-uniform characteristic selected from the group consisting of a material, a thickness, a length, an angle, a layer, and combinations thereof to generate a specific spectrum responsive to interacting with neutrons that is different than a spectrum of the neutron source.

2. The neutron spectrum generator of claim 1, wherein the at least one material shell is a cylindrical shape.

3. The neutron spectrum generator of claim 1, wherein the at least one material shell is a hemispheric shape.

4. The neutron spectrum generator of claim 1, wherein the at least one material shell is a shape symmetric about its axis, wherein the axis is a vector extending from the neutron source through the scatterer to the neutron detector.

5. The neutron spectrum generator of claim 1, wherein the at least one non-uniform characteristic of the material shell is divided according to angular wedges of the material shell.

6. The neutron spectrum generator of claim 1, wherein the neutron source is a DT generator configured to produce neutrons by fusion of deuterium (D) and tritium (T).

7. The neutron spectrum generator of claim 1, wherein the neutron source is a DD generator configured to produce neutrons by fusion of deuterium (D) and deuterium (D).

8. The neutron spectrum generator of claim 1, wherein the neutron source is selected from the group consisting of a gamma source configured to eject a neutron, an electron accelerator beam, and a Bremsstrahlung converter.

9. The neutron spectrum generator of claim 1, wherein the at least one material shell includes multiple material shells.

10. The neutron spectrum generator of claim 9, wherein the multiple material shells are configured to generate the specific spectrum exhibiting multiple peaks.

11. The neutron spectrum generator of claim 1, wherein the specific spectrum is an approximation of the spectrum for Californium-252, and the neutron source is a different source than Californium-252.

12. A method for generating a specific neutron spectrum, the method comprising:
    measuring a first response generated responsive to a first material shell of a neutron spectrum generator interacting with a neutron source;
    replacing the first material shell with a second material shell;
    measuring a second response generated responsive to the second material shell of a neutron spectrum generator interacting with the neutron source; and
    determining a total fission response by determining a difference between the first response and the second response.

13. The method of claim 12, further comprising forming the first material shell and the second material shell to each have at least one non-uniform characteristic selected from the group consisting of a material, a thickness, a length, an angle, a layer, and combinations thereof to generate a specific spectrum at a neutron detector that is different than a spectrum of the neutron source.

14. The method of claim 13, further comprising forming the first material shell and the second material shell to each have a cylindrical shape.

15. The method of claim 12, further comprising forming the first material shell including uranium and the second material shell including lead.

16. The method of claim 12, further comprising generating neutrons with the neutron source.

17. The method of claim 16, wherein generating neutrons with the neutron source includes utilizing at least one of a DT generator, a DD generator, a gamma source configured to eject a neutron, an electron accelerator beam, or a Bremsstrahlung converter.

18. The method of claim 12, wherein measuring the first response and the second response each include utilizing an active neutron detector.

19. The method of claim 12, wherein measuring the first response and the second response each include utilizing a passive neutron detector.

20. The method of claim 12, wherein measuring the first response and measuring the second response comprises measuring one of the first response and the second response as a positive response and the other of the first response and the second response as a negative response.

\* \* \* \* \*

UNITED STATES PATENT AND TRADEMARK OFFICE
CERTIFICATE OF CORRECTION

PATENT NO. : 11,079,504 B2  
APPLICATION NO. : 15/971767  
DATED : August 3, 2021  
INVENTOR(S) : Wade Scates Page 1 of 1

It is certified that error appears in the above-identified patent and that said Letters Patent is hereby corrected as shown below:

In the Specification  
    Column 8,     Lines 62-64,     change "different materials 822, 823, 824, 825, 826, 827, 828, 829, 830, 831, 832, 833, 834, 835, 836, 837, 838, 839, 840, 841, 842 (Graphite, Glass," to --different materials (Graphite, Glass,--

Signed and Sealed this  
Ninth Day of November, 2021

Drew Hirshfeld  
*Performing the Functions and Duties of the*  
*Under Secretary of Commerce for Intellectual Property and*  
*Director of the United States Patent and Trademark Office*